INVENTOR.
Edwin Dyke
BY
Foorman L. Mueller
Atty.

Sept. 4, 1956 E. DYKE 2,762,041

SIGNALLING EQUIPMENT

Filed Sept. 9, 1950

3 Sheets-Sheet 2

INVENTOR.
Edwin Dyke
BY
Norman L. Mueller
Atty.

Sept. 4, 1956 E. DYKE 2,762,041

SIGNALLING EQUIPMENT

Filed Sept. 9, 1950 3 Sheets-Sheet 3

INVENTOR.
Edwin Dyke
BY
Foorman L. Mueller
Atty.

United States Patent Office 2,762,041

Patented Sept. 4, 1956

2,762,041

SIGNALLING EQUIPMENT

Edwin Dyke, Brookfield, Ill., assignor to Motorola, Inc., Chicago, Ill., a corporation of Illinois Application September 9, 1950, Serial No. 183,974

7 Claims. (Cl. 343—100)

The present invention relates generally to communications equipment and more particularly to housing arrangements for communications equipment which provides protection for the equipment against various weather conditions.

When installing electronic signalling equipment, it has been common practice to place the equipment in space available in a building, or in a "shack" expressly built for that purpose. This has been due to the fact that such known equipment was contained in housings which offer little protection to the equipment against changing weather conditions. In the event that a separate "shack" has to be built, the installation becomes extremely costly for known shacks have all been built of lumber in substantially the same manner as a one room house. This is particularly undesirable when the "shack" is not required for other purposes, but it has been the situation in many microwave relay installations where only the microwave relay equipment was needed at a particular station.

Another problem involved in microwave installations is the interconnection between the equipment and the antenna. In systems in which this interconnection is made by wave guides, it is desirable that the wave guide be as short as possible both to keep the cost thereof low and to eliminate the attenuation produced by the wave guide. A still further consideration in the development of such equipment is to provide housings in which the equipment may be inspected and/or repaired without removing the equipment from the housing. This becomes more difficult when the housing is of a weatherproof construction.

It is therefore one object of the invention to provide improved mounting and housing facilities for electronic signalling equipment which is used in remote places, or in locations having buildings wherein sufficient space is not available for such signalling equipment.

Another object of the invention is to provide housing and mounting facilities for microwave equipment which include simple and inexpensive means for supporting an antenna structure and for connecting the same with the microwave equipment.

Another object of the invention is to provide housing means for electronic signalling equipment which provides protection against various weather conditions and which is of such construction to facilitate servicing the equipment.

A feature of the invention is the provision of a fixed position, weather-tight housing having weather-tight passageways therein for accommodating power supply, signal input and output conductors, and the like.

Another feature of the invention is the provision of a microwave relay system wherein the antenna for the system is physically mounted on the housing for the radio frequency stages of the system, the housing acting as an anchor for supporting the antenna.

Still another feature of the invention is the provision of a housing for electronic signalling equipment having improved means for simplifying installation and interconnection of the various items of equipment within the housing.

A further feature of the invention is the provision of a relatively flat, rectangular outdoor housing for electronic signalling equipment wherein the two large dimension opposing sides can be easily opened to provide access to the equipment for servicing purposes and can be sealed to provide protection against various weather conditions.

Other objects, features and many of the attendant advantages of this invention will become better understood upon a reference to the following detailed description taken in connection with the accompanying drawings, wherein.

In practicing the invention a weather-tight housing is provided for a unit of a microwave communications system. The electronic signalling equipment itself is mounted on one or more chassis, with connections made thereto through plug connectors mounted on the outside of the chassis, and with the radio frequency signal portions thereof connected to a portion of a disengageable wave guide joint mounted on the outside of the chassis. The chassis is adapted to be seated in a movable tray mounted within the weather-tight housing. Positioned on the housing in the line of travel of the movable tray are the second portions of the plug connector, and a second half of the disengageable wave guide joint, both of which are adapted to make with their corresponding parts on the chassis when the tray is moved towards them. The housing comprises a substantially rectangular frame having a pair of opposed, broad doors hinged thereon which are adapted to form a weather-tight seal against the frame, and may include a heater element for controlling the temperature condition therewithin. The housing physically supports the antenna for the electronic signalling equipment included in the housing and forms an anchor or supporting foundation therefor. The antenna may be directly connected to the portion of the wave guide secured to the housing so that the antenna mounting and connection is greatly simplified. The housing may be used to enclose the entire microwave equipment in a simple system, or only a part of the equipment in a more complicated system.

Figures 1, 2:
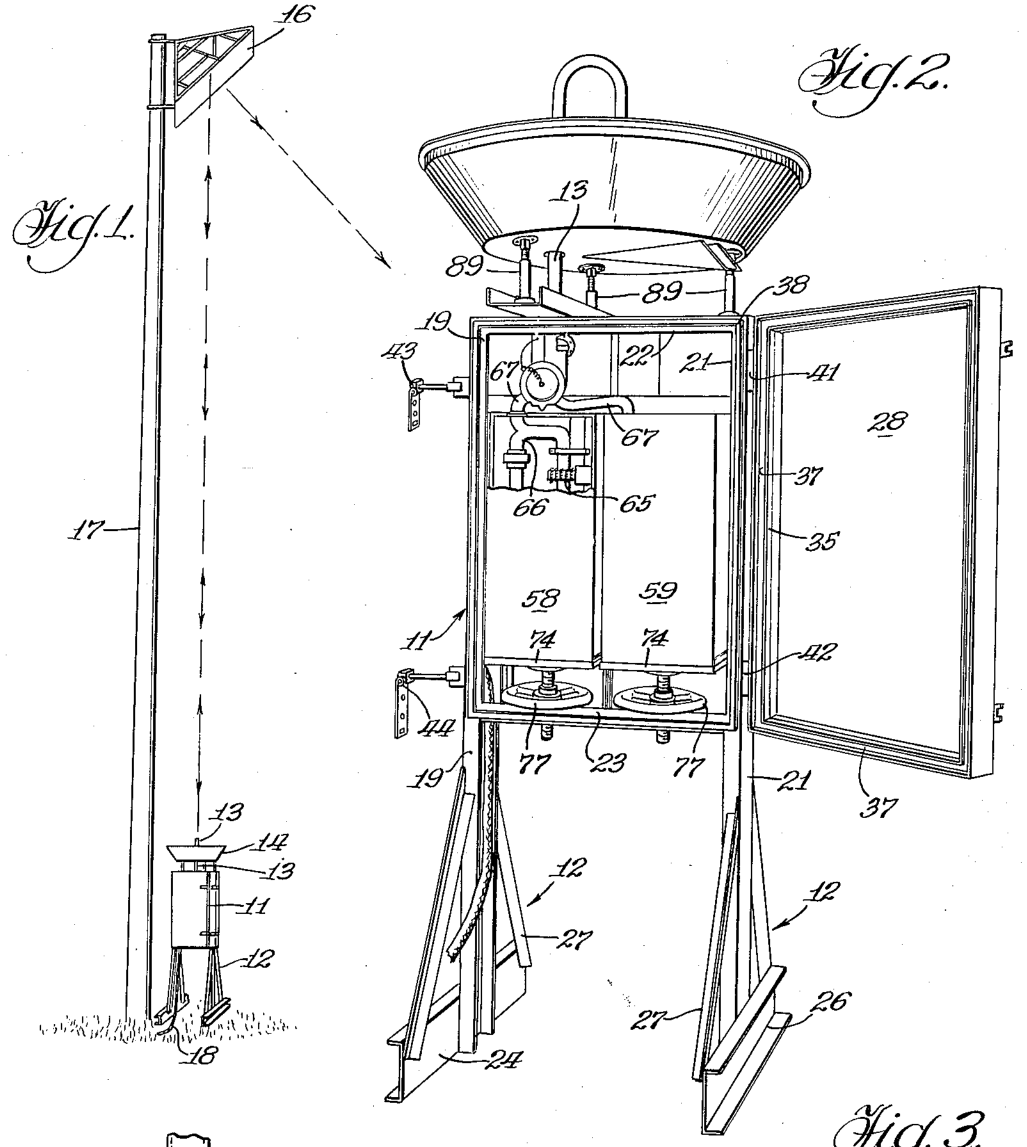
Fig. 1 is a perspective view of a station comprising a part of a microwave communication relay system, and constructed in accordance with the invention.
Fig. 2 is a perspective view of an opened up electronic signalling unit constructed in accordance with the invention.

Referring now to Fig. 1 of the drawings, a station of a microwave communication system constructed in accordance with the invention is shown. The station includes a housing 11 containing electronic signalling equipment that is mounted on pedestal stand 12. The signals to be received or to be transmitted by the signalling equipment in housing 11, are fed through a wave guide section 13, and are either beamed into, or picked up, from a parabolic reflector 14 secured to the top of housing 11. This signal is reflected from a plain reflector 16 mounted on a pole 17 secured in the ground adjacent housing 11, and is positioned at a relatively high point above the ground. Energizing potential, as well as input and/or output signals are supplied to the signalling equipment contained within housing 11 through a conductor 18 which leads to a control point containing the control end of the equipment in housing 11.

By constructing the repeater, or if necessary the terminal station of a microwave link system in the above described manner, it can be appreciated that a considerable reduction in the cost of the installation of such a system, can be achieved. In the case of repeater stations which are generally located at remote spots, it can be seen that the need for the construction of a shack for housing for the equipment, is done away with. All that need be furnished, is a small power supply doghouse which could be constructed at very little cost for housing a power supply device which could be connected to the equipment in housing 11 through conductor 18. In the event that the equipment in housing 11 contains its own power supply unit, not even the doghouse would be required; thereby reducing the cost of installation of such repeater stations even further. In the case of terminal stations of a link system, should existing shacks be crowded with other equipment, no new shack to house the equipment need be erected. All that is required is that sufficient room be found in existing shacks to house the control end of the signalling equipment contained within housing 11, and the control end of the equipment be coupled through the conductor 18 to the signalling equipment in housing 11. Thus, it is seen that the invention provides a means for reducing the cost of installation of terminal stations, as well as repeater stations of a communication link system. In addition to the above two advantages, the housing 11 serves as a heavy, stable support for the antenna reflector 14 and antenna 13, thereby reducing the cost of installation of the unit by doing away with the need for relatively complex supporting structures for the antenna and reflector. By mounting the transmitter and receiver units immediately adjacent the antenna 13, it is seen that the link of the wave guide section coupling the antenna to either the transmitter or receiver unit contained within housing 11, is greatly reduced. This not only results in a savings in the cost of the wave guide sectioning required to couple the transmitter and/or receiver unit to the antenna, but also reduces the attenuation effects of long lengths of wave guides.

Figure 3:
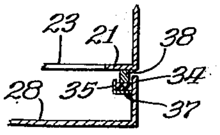
Fig. 3 is a fragmentary, cross-sectional view of the structure shown in Fig. 2, illustrating the weather-tight sealing provided on the doors of the structure.

In order to be able to construct microwave link systems stations of the type described in the preceding paragraphs, it is essential that the housing 11 be sufficiently rugged, and weather-tight to prevent deterioration of the equipment contained within it. Referring now to Fig. 2 of the drawings, housing 11 comprises a relatively large, rectangular frame consisting of a pair of inwardly facing, parallel, U-shaped sheet metal or extruded channel members 19 and 21, joined by an upper, downwardly facing, transverse, U-shaped, sheet metal channel member 22, and a downwardly facing, U-shaped, transverse, sheet metal channel member 23. The frame thus constructed is supported by a pair of pedestal legs 12 comprising a U-shaped, sheet metal channel member 24 and 26 secured to the ends of channel members 19 and 21, respectively, at right angles with respect thereto, and braced by inclined members 27. Hinged to both sides of the frame are sheet metal doors, such as that shown at 28 having a width substantially equal to the distance between the outside faces of channel members 19 and 21, and a length substantially equal to the outside edges of horizontal channel members 22 and 23. As is best shown in Fig. 3, door 28 has an integral inwardly projecting rim 34 arranged around its outer periphery. Cooperating with rim 34, is an L-shaped member 35 which together with rim 34 defines a U-shaped groove around the outer periphery of door 28. Mounted within the U-shaped groove thus defined, is a resilient sealing member 37 constructed of rubber or the like, which is adapted to seat a rectangular rim 38 secured to the outer faces of channel members 19, 21, 22 and 23. By this construction, when the door 28 is closed, the outer edges of channel members 19, 21, 22, 23, inwardly projecting rim 38 and the resilient sealing member 37 serve to provide a weather-tight closure.

Figure 5:
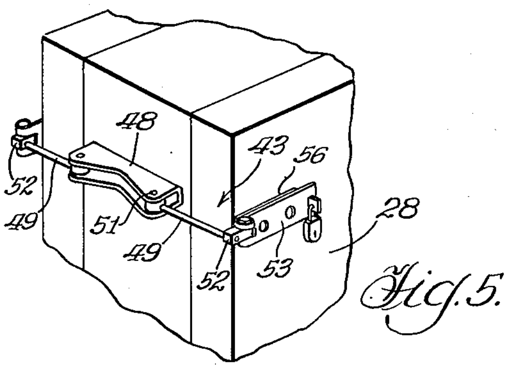
Fig. 5 is a fragmentary, perspective view of a locking latch device used on the structure shown in Fig. 2.
Figure 8:
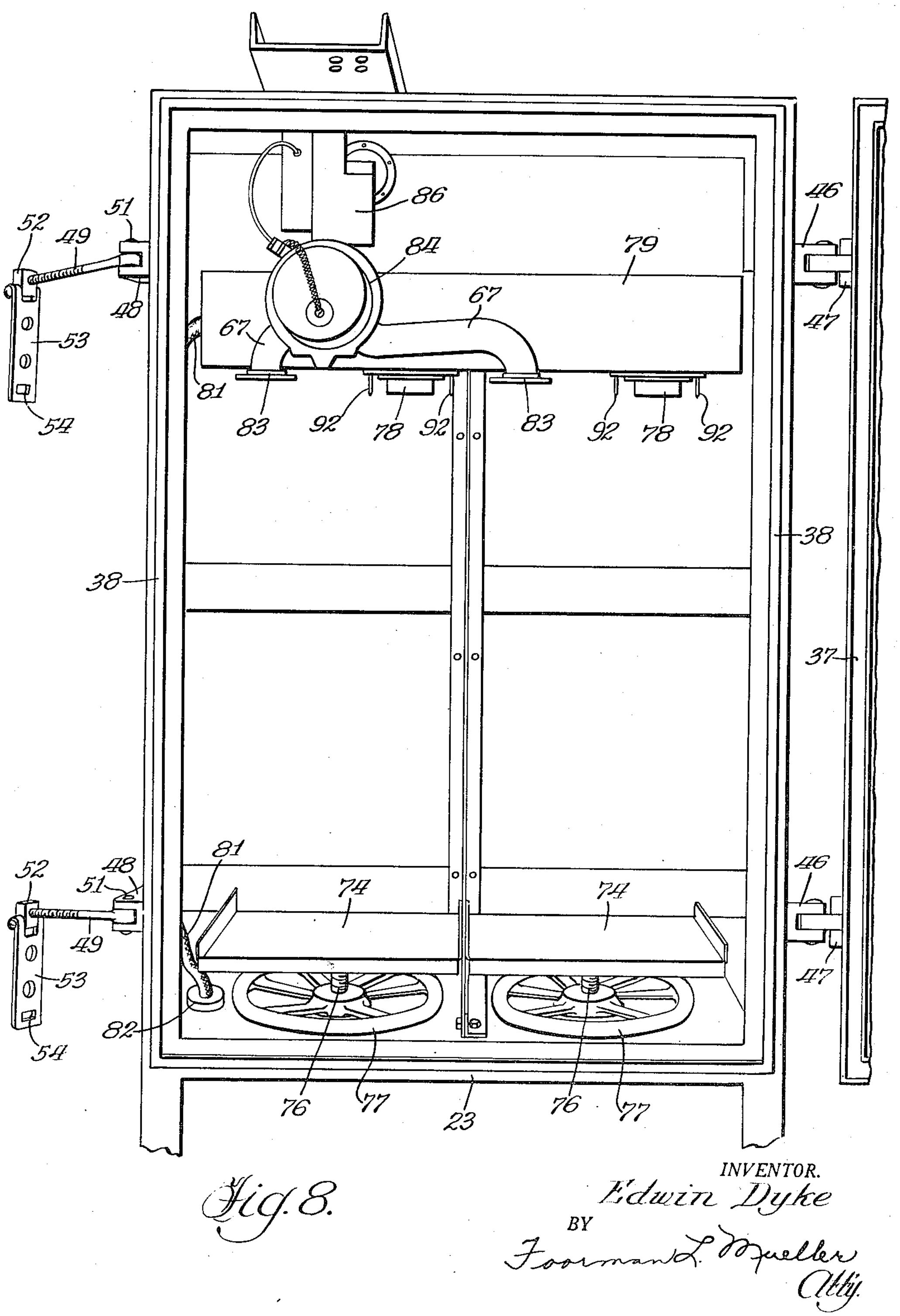
Fig. 8 is a front perspective view of the interior of the housing structure shown in Figs. 2 and 7 with electronic signalling equipment removed.

In order that the door 28 be sealed tightly over the open side of housing 11, and that injury to equipment within the housing due to tampering by trespassers be prevented, a weather sealing hinge and locking latch construction is provided for the door. As is best shown in Fig. 2, there are two hinges 41 and 42, and two locking latches 43 and 44 for each door. Referring to Fig. 8, the hinging members 41 and 42 comprise a bifurcated member 46 pivotally supporting a tongue member 47, and, as is best seen in Fig. 5, each of the latching devices, such as 43, includes a substantially U-shaped, cast base member 48 having a depressed central, and rounded, outwardly protruding in portions in which pivot pin apertures are formed. Base member 48 is secured to the frame of housing 11 at right angles to the axis of rotation of each of the doors 28, and has a locking bolt 49 pivotally secured in each of its end portions by a pivot pin 51. Threaded to the end of locking bolt 49 is a locking nut 52 having an elongated plate 53 pivotally secured thereto. Plate 53 has a substantially rectangular aperture in its end, and comprises one part of the locking hasp. The other part of the locking hasp consists of an elongated plate 56 secured to the outer face of door 28 and having one of its ends turned up and shaped to form a locking staple that cooperates with the aperture in plate 53. Each of the hinging members 41 and 42 is of standard construction, and together with the latching structure 43 and 44, serve to retain each of the doors 28 sealed tightly against the outer edges of the frame of housing 11; thereby providing a weather-tight housing. Should the gasket material 37 fail to seal the closure sufficiently well, due to wear and continued use, nut 52 can be taken up on bolt 49 thereby fitting the door 28 more snugly against the frame of the housing.

Figure 6:
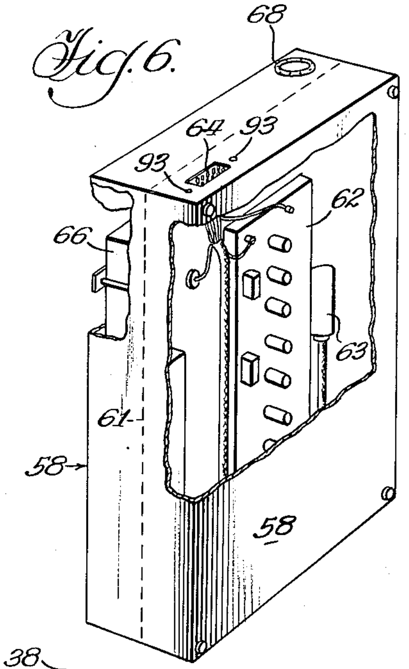
Fig. 6 is a perspective, partially broken away view of a chassis containing electronic signalling equipment, and constructed in accordance with the invention.

Adverting again to Fig. 2, housing 11 supports a pair of chassis 58 and 59 containing signalling equipment, chassis 58 containing the main or primary unit, and chassis 59 containing the standby unit. As the construction of the standby unit 59 is identical to that of the primary unit 58, the following discussions will relate to a single unit only. As is best shown in Fig. 6, the chassis 58 comprises a substantially rectangular box of sheet metal having a pair of opposed, removable front pieces, secured thereto by a plurality of screws, and a central partition indicated by dotted lines 61 which divides the chassis into two portions. In one portion an intermediate frequency carrier strip or amplifier section of a receiver, as well as subcarrier modulating signal amplifier indicated by strip 62, is mounted along with other component systems of a transmitter-receiver unit comprising the electronic equipment contained within chassis 58. Energizing power for the entire unit, as well as input and output signals are supplied through a portion of a connector means 64 comprising a half of a Cannon plug mounted on the top edge of chassis 58. The remaining portion of chassis 58 houses the radio frequency end of the transmitter-receiver unit, and as the particular unit in question is designed to operate in the microwave region of the spectrum, this portion of the chassis houses the plumbing, or wave guide sections 66 of the radio frequency stages of both the transmitter and receiver. In order to provide a connection between the section of wave guides 66, best seen in Fig. 2, and a section of wave guide 67 mounted in the upper part of housing 11, a half of a breakable wave guide joint 68 best seen in Fig. 6, is mounted on the top edge of chassis 58 along with the connector 64. For the purpose of maintaining a somewhat constant range of operating temperature, a heater unit 65 is also included within the chassis 58. By this construction, substantially all of the component working parts of the transmitter-receiver communications unit are contained within a single, compact chassis which can be easily removed for servicing purposes.

Figure 7:
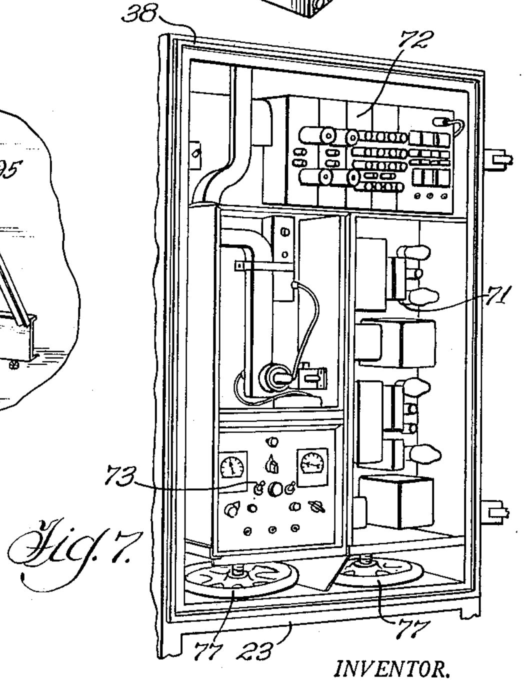
Fig. 7 is a perspective view of an opened up, electronic signalling unit comprising a second version of the invention.

Should it be desired to locate all of the components system of a microwave link in the weather-tight housing, the construction of chassis 58 and 59 can be modified in the manner illustrated in Fig. 7. Referring to Fig. 7 in place of mounting a standby unit in chassis 59, a complete power supply, indicated at 71, is mounted in chassis 59, and is divided between the two interior portions of chassis thereof formed by partition 61. Connection of the power supply unit is made through connector means substantially identical in construction to the connector means 64. In addition to the power supply unit, a subcarrier modulator unit, indicated at 72, and a control panel indicated at 73, are mounted within housing 11 to form a complete station. All that need be supplied through conductor is primary power, and input and output audio signals.

Figure 4:
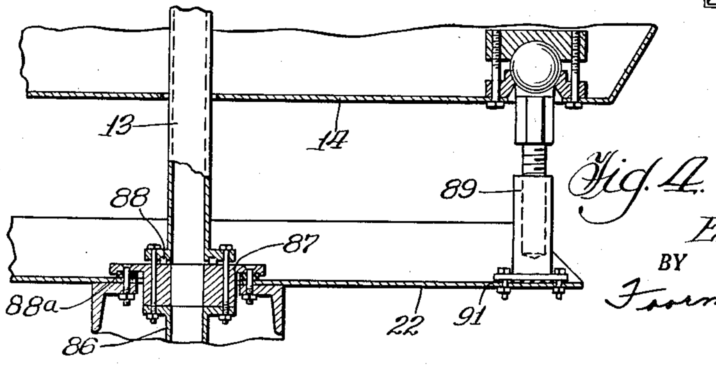
Fig. 4 is a fragmentary sectional view through the top of the structure shown in Fig. 2.

Each of the housings 58 and 59 are seated in trays 74 which are movable with respect to housing 11. As is best shown in Fig. 8, each of the trays 74 comprise nothing more than flat platforms supported by threaded shafts 76 which are journalled in hand wheels 77 rotatably mounted on the lower transverse channel member 23 of the housing frame. Mounted on the end of housing 11 opposite trays 74 and in the line of travel of the trays, is a second portion of a connector means 78 which may comprise a half of a Cannon plug that is adapted to mate with the connector means 64 on chasis 58 or 59. Connector means 78 are connected through a terminal strip 79 and a multi-conductor cable 81, through a gasketed opening 82 providing a weather-tight passageway for cable 81 in housing 11, to a source of energizing power, and input and output signals. In event chassis 58 and 59 are constructed as shown in Figs. 2 and 6, the signals are subcarrier modulating signals, in event the chassis are constructed as shown in Fig. 7, the signals are audio frequency signals. Adjacent connector means 78 is a half of a breakable wave guide joint 83 which is connected through wave sections 67, and wave guide selector switch 84, to a wave guide section 86. As is best shown in Fig. 4, wave guide section 86 has its upper end flanged, and is joined to a centrally apertured coupling member 87 by a plurality of bolts. Coupling member 87 projects through an opening in the upper end or top 22 of the housing 11 frame, and is in turn joined to waveguide section 13 that feeds the parabolic reflector in mount 14. The junctions of waveguide section 13 and coupling member 87, and of coupling member 87 and the top 22 are sealed closed by a pair of gaskets 88 and 88A respectively, and other connections to the housing which require holes to be cut in the housing, such as the mounting post 89 for reflector mount 14, are provided with a gasket material 91 for the purpose of maintaining the interior of the housing sealed closed against the weather. By this means the waveguide feed 13 and parabolic reflector mount 14 can be firmly anchored to the housing without in any way impairing the weather-tight integrity of the housing.

The mounting posts 89, as clearly shown in Figures 2 and 4 of the drawings, provide adjustable threaded interconnections between the housing channel member 22 and the reflector 14, so that by adjusting each post 89, the reflector 14 may be tilted to various supported positions on the housing. Thus the radiated beam direction may be easily adjusted, and this is of particular advantage when using the second plane reflector 16 of Figure 1 which, itself, is in a relatively inaccessible location, and therefore difficult to adjust.

In order to mount either the chassis 58 or 59 within the housing, all that is required is that the chassis be seated on top of the tray 74, and the moving means comprising hand wheel 77 and threaded shaft 76 be turned in a direction to move the tray toward connector means 78 and wave guide joint 83. Assuming that the wave guide joint 68, and the connector means 64 on the chassis 58 are properly aligned with the corresponding parts 83 and 78 on the housing 11, then as tray 74 moves upwardly, a pair of guides 92 fixed to housing 11 on opposite sides of connector portion 78 engage a pair of guide holes 93 in chassis 58 on opposite sides of connector portion 64, and cause connector portions 64 and 78, and wave guide joints 68 and 83 to close on each other in such a fashion as to establish a closed electrical circuit through both devices. In order to remove either of the chassis 58 or 59, all that is required is that the moving means be turned in such a direction as to retract the tray 74 away from connector means 78 and waveguide joint 83. Thus, it is seen that the housing 11 greatly simplifies maintenance of the signalling equipment it contains in that such equipment can be easily removed for transportation to a central workshop, in the case of a major breakdown. Upon completion of the necessary repair work in a shop having proper facilities for effecting such repair work, the equipment can be quickly replaced within the housing 11 with a minimum of lost time; thereby assuring that the entire system not be out of working order for any greater periods of time than absolutely necessary. In the event that a minor check of the equipment is all that is required, either one of the doors 28 can be opened, the front piece of the chassis 58 closing the portion of the equipment to be checked and removed, and the work can be easily accomplished while the unit is still in place.

Figure 9:
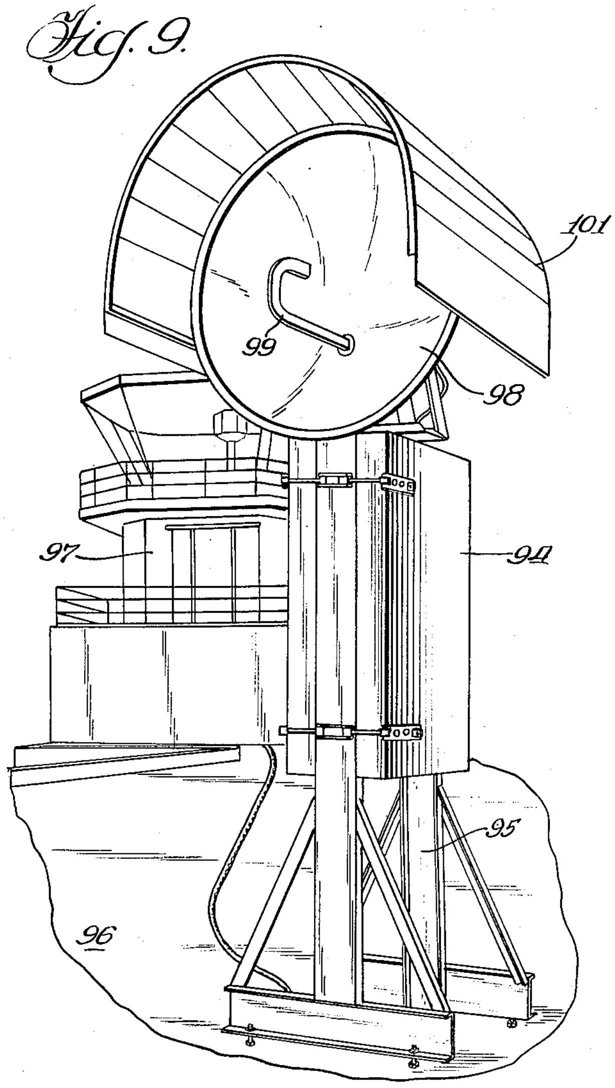
Fig. 9 is a perspective view of a second type of a communication station constructed in accordance with the invention.

Referring now to Fig. 9 of the drawings, a second embodiment of a microwave communication link station is shown. The station includes a housing 94 containing the microwave communication equipment mounted on a pedestal stand 95. Stand 95 is bolted to the top or roof of a building indicated by surface 96, and on which an airport control tower or the like, indicated by the structure 97 is situated. As the construction of the housing 94, the electronic signalling equipment contained within, and the pedestal stand 95, are identical to the construction of the housing 11 shown in Fig. 1, a further description of their details is not believed to be necessary. The station shown in Fig. 9 differs, however, from that shown in Fig. 1 in the manner in which the antenna reflector 98 and radiating horn 99 are mounted on the housing 94. As is shown in Fig. 9, reflector 98 and horn 99 are constructed in such a manner that the beam radiated by the equipment is in a horizontal plane. With the reflector 98 arranged in this manner, the top of housing 94 receives very little or no protection from it. Therefore, open ended, semi-cylindrical umbrella 101 is mounted over reflector and housing 94 to provide the necessary protection to the housing. By constructing the station in this manner, it can be mounted on top of buildings available in the area to be serviced by the station; thereby doing away with the need of providing a plane reflector on top of a tall pole erected adjacent the equipment, and reduces the cost of installation of equipment even further.

From the foregoing description it can be appreciated that the invention provides a novel electronic signalling unit that is contained within a weather-tight housing, and which can be easily and cheaply installed in any desired location. By reason of the weather-tight housing, deterioration of the equipment is prevented, and because of its design, maintenance of the unit is greatly simplified.

Obviously, other modifications and variations of the invention are possible in the light of the above teachings. It is therefore to be understood that changes may be made herein which are within the full intended scope of the invention as defined by the appended claims.

I claim:

1. A unitary microwave communications station including in combination, a weather-tight outdoor housing for containing electronic signalling equipment comprising a frame having a pair of opposed open sides, a chassis case having a central portion dividing said chassis case into two substantially equal chambers for receiving electronic signalling equipment, one of said chambers being adapted to receive a portion of said equipment, and the remaining chamber being adapted to receive the remaining portion of said equipment, said chassis case being vertically mounted in said housing in such a manner that one of said chambers is accessible from one of said open sides and the other of said chambers is accessible from the other of said open sides, doors mounted on opposite sides of said housing for closing each of said open sides, and sealing means cooperating with said frame and said doors to provide a weather-tight seal for said housing when said doors are closed, antenna means secured to said frame and including a portion extending into said housing and operatively connected to said signalling equipment, and weather-tight sealing means interposed between said antenna portion and said housing.

2. A communications unit including a fixed position unitary housing and frame structure including a weather-tight housing having openings therein, weather-tight closures for sealably closing said openings, electronic signalling equipment contained within said housing, at least one of said weather-tight closures being movable to provide ready access to the interior of said housing, radio frequency energy radiating means physically supported by said housing and electrically connected to said signalling equipment through another of said weather-tight openings, beam forming reflector means adjustably mounted on said housing and frame structure with its beam forming surface facing outward from said housing, said radiating means being positioned to direct energy radiated therefrom into said beam forming reflector, and second reflector means physically disposed in the path of the beam of radio frequency energy emerging from said beam forming reflector for directing such beam in a different direction, with the precise direction of the beam from said second reflector means being controlled by the adjustable mounting of said beam forming means.

3. A unitary microwave communications station including in combination, a fixed-position weather-tight housing having an opening in one of the sides thereof, a gasketed door mounted on said housing for sealably closing said opening, a chassis including electronic signalling equipment thereon having a wave guide portion and a circuit connector portion, a movable tray positioned in said housing for seating said signalling equipment chassis, means for moving said tray relative to said housing and transversely of said opening, a portion of a breakable wave guide joint mounted on said housing in the line of travel of said tray, a portion of a circuit connector fixed to said housing in the line of travel of said tray, said wave guide joint portion and said circuit connector portion on said housing being adapted to automatically establish electrical connection with said wave guide portion and said circuit connector portion of said signalling equipment seated on said tray, upon said tray being moved towards said circuit connector portion and said wave guide joint portion, a section of rigid wave guide for coupling said wave guide joint portion to radiating means outside said housing, said housing having a gasketed aperture therein providing a weather-tight passageway for said wave guide section, and a multi-conductor cable connected to said circuit connector portion, said housing having a second gasketed aperture therein providing a weather-tight passageway for said cable.

4. A microwave communications transmitter-receiver unit for outside installation including a housing having a top, a bottom, and frame means forming a pair of extended sides to support said housing, said housing having openings in a pair of opposed sides thereof, a pair of gasketed doors mounted on said housing providing a weather-tight closure over said openings, a movable tray mounted adjacent said bottom of said housing, means for moving said tray relative to said housing in a direction parallel to said extended sides, a chassis containing a microwave transmitter-receiver communications unit seated on said tray, a first portion of a disengageable wave guide joint mounted on said chassis and operatively connected to said transmitter-receiver unit, a first portion of a circuit connector mounted on said chassis and operatively connected to said transmitter-receiver unit, a second portion of a disengageable wave guide joint and a second portion of a circuit connector mounted on said top of said housing in the line of travel of said tray, said second wave guide portion being adapted to cooperate with said first wave guide portion to automatically establish a closed wave guide joint, and said second connector being adapted to cooperate with said first connector portion to automatically establish a closed electrical circuit upon said tray being moved towards said second wave guide joint and said second connector portion, a rigid wave guide section leading from said second portion of said wave guide joint to radiating means outside said housing, and a lead in multi-conductor cable connected to said second circuit connector portion for energizing said transmitter-receiver unit and providing input and output signals thereto, said housing having openings therein for accommodating said wave guide section and said lead in cable, and weather-tight sealing means in said openings providing a seal between said housing and said wave guide section and said lead in cable.

5. A communications unit including a weather-tight housing having openings therein, weather-tight closures for sealably closing said openings, electronic signalling equipment contained within said housing, at least one of said weather-tight closures being movable to provide ready access to the interior of said housing, radio frequency energy radiating means physically supported by said housing and including a rigid wave guide portion electrically connected to said signalling equipment through another one of said weather-tight openings, beam forming reflector means adapted to be mounted on said housing with its beam forming surface facing outward from said housing, said wave guide portion being positioned to direct energy radiated therefrom into said beam forming reflector, and adjustable mounting means interconnecting said reflector means and said housing whereby said reflector means may be adjustably and fixedly positioned on said housing to direct energy reflected thereby in different adjusted directions.

6. A unitary microwave communications station including in combination, an outdoor weather-tight housing and frame structure, frame means forming the primary support for said structure, chassis means supported in said housing and including microwave communication equipment thereon, means including said frame means and at least one weather-tight door forming a rugged weather-tight housing for said chassis means and permitting access thereto, antenna means supported on said frame means including rigid wave guide means and reflector means, said wave guide means extending through said housing and being rigidly secured thereto, means providing a weather-tight seal between said wave guide means and said housing, and adjustable supporting means for said reflector means for adjusting and fixedly securing the position thereof with respect to said frame means and said wave guide means.

7. A communications unit for outdoor installation, including in combination, a frame having top and bottom portions and extended sides for support thereof, a pair of gasketed doors mounted on said frame providing a weather-tight enclosure therein, a support shelf disposed adjacent said bottom portion of said frame and including means to move said shelf perpendicular to said bottom and top portions, an enclosed chassis container supported on said shelf and serving to house electronic equipment, wave guide means with a first portion secured in said top portion of said frame through a weather-tight seal and a second portion secured to said chassis container, said first and second portions forming a connector to said container disengageable by operation of said means to move said shelf, antenna means disposed on said top portion of said frame including a rigid wave guide section and reflector means, said wave guide section being connected to said first portion of said wave guide means, and adjustable means securing said reflector means to said top portion permitting selection of a fixed relation between said antenna means and said frame for directing said reflector in a selected direction.

References Cited in the file of this patent

UNITED STATES PATENTS

| | | |
|---|---|---|
| 1,931,980 | Clavier | Oct. 24, 1933 |
| 1,947,018 | Plastino | Feb. 13, 1934 |
| 2,043,347 | Clavier et al. | June 9, 1936 |
| 2,115,787 | Runge | May 3, 1938 |
| 2,178,220 | Blancha | Oct. 31, 1939 |
| 2,234,244 | Gossel | Mar 11, 1941 |
| 2,312,093 | Hammond | Feb. 23, 1943 |
| 2,408,373 | Chu | Oct. 1, 1946 |
| 2,438,454 | Riebe | Mar. 23, 1948 |
| 2,473,454 | Sichak | June 14, 1949 |
| 2,530,098 | Van Atta | Nov. 14, 1950 |
| 2,531,454 | Marshall | Nov. 28, 1950 |
| 2,537,822 | Fritts | Jan. 9, 1951 |
| 2,550,700 | Lancor et al. | May 1, 1951 |
| 2,579,141 | Eckert et al. | Dec. 18, 1951 |